United States Patent
Kim et al.

(10) Patent No.: US 12,449,858 B2
(45) Date of Patent: Oct. 21, 2025

(54) DISPLAY DEVICE

(71) Applicant: LG Display Co., Ltd., Seoul (KR)

(72) Inventors: TaeWoo Kim, Paju-si (KR); HeongSoo Park, Goyang-si (KR); Kyungjae Park, Incheon (KR)

(73) Assignee: LG Display Co., Ltd., Seoul (KR)

( * ) Notice: Subject to any disclaimer, the term of this patent is extended or adjusted under 35 U.S.C. 154(b) by 196 days.

(21) Appl. No.: 18/485,091

(22) Filed: Oct. 11, 2023

(65) Prior Publication Data

US 2024/0168523 A1 May 23, 2024

(30) Foreign Application Priority Data

Nov. 22, 2022 (KR) .......................... 10-2022-0157403

(51) Int. Cl.
*G06F 1/16* (2006.01)

(52) U.S. Cl.
CPC .......... *G06F 1/1656* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,736,162 B2 * | 5/2014 | Jin | .............................. | G09F 9/33 313/511 |
| 9,430,180 B2 * | 8/2016 | Hirakata | ............... | G06F 3/1446 |
| 10,224,502 B2 * | 3/2019 | Cho | .......................... | B05D 7/50 |
| 10,347,176 B2 * | 7/2019 | Lee | ......................... | G06F 3/0412 |
| 10,394,069 B2 * | 8/2019 | Yamazaki | ................. | G09G 3/32 |
| 10,921,857 B2 * | 2/2021 | Kim | ...................... | H10K 77/111 |
| 11,003,009 B2 * | 5/2021 | Yamazaki | ................. | G09G 3/20 |
| 11,343,922 B2 * | 5/2022 | Park | .......................... | H05K 5/03 |
| 11,450,832 B2 * | 9/2022 | Lee | ...................... | H10K 50/841 |
| 11,482,587 B2 * | 10/2022 | Cho | ...................... | H10D 89/921 |
| 11,550,181 B2 * | 1/2023 | Yamazaki | ............... | H10F 55/10 |
| 11,573,606 B2 * | 2/2023 | Kim | ...................... | H10D 86/451 |
| 11,574,605 B2 * | 2/2023 | Paek | ..................... | G09G 3/3291 |
| 11,616,106 B2 * | 3/2023 | Kim | ...................... | H10K 59/123 257/72 |

(Continued)

FOREIGN PATENT DOCUMENTS

| | | |
|---|---|---|
| CN | 112562496 A | 3/2021 |
| DE | 202012013509 U1 | 5/2017 |

(Continued)

*Primary Examiner* — Lisa Lea-Edmonds
(74) *Attorney, Agent, or Firm* — Seed Intellectual Property Law Group LLP

(57) ABSTRACT

A display device includes a display panel with a non-bending area and bending areas, and a metal plate disposed on a lower portion of the display panel and configured to support the display panel. The bending areas include first bending areas corresponding to a lateral portion of the non-bending area, and second bending areas corresponding to a corner of the non-bending area. The metal plate includes a first metal plate disposed in the non-bending area, a second metal plate disposed to correspond to the first bending areas, and a third metal plate disposed to correspond to the second bending areas with a groove is disposed in the second metal plate, and the third metal plate includes a plurality of opening portions to reduce stress caused by bending.

23 Claims, 8 Drawing Sheets

(56) References Cited

U.S. PATENT DOCUMENTS

| | | | | |
|---|---|---|---|---|
| 11,796,871 | B2* | 10/2023 | Yamazaki | G02F 1/136286 |
| 11,927,987 | B2* | 3/2024 | Lee | B32B 7/12 |
| 11,940,837 | B2* | 3/2024 | Cho | G06F 1/1626 |
| 11,979,997 | B2* | 5/2024 | Kwak | G06F 1/1641 |
| 12,133,451 | B2* | 10/2024 | Choi | B32B 27/283 |
| 12,147,635 | B2* | 11/2024 | Bok | G06F 3/0446 |
| 12,185,485 | B2* | 12/2024 | Lee | G02F 1/133305 |
| 12,222,766 | B2* | 2/2025 | Li | G06F 1/1681 |
| 12,235,537 | B2* | 2/2025 | Yamazaki | G02F 1/13471 |
| 2010/0201604 | A1* | 8/2010 | Kee | G06F 1/1641 |
| | | | | 345/1.3 |
| 2017/0098794 | A1* | 4/2017 | Cho | G06F 1/1626 |
| 2021/0337691 | A1* | 10/2021 | Lee | H05K 5/04 |
| 2023/0096985 | A1* | 3/2023 | Chen | B32B 3/266 |
| | | | | 257/40 |
| 2024/0168523 | A1* | 5/2024 | Kim | G06F 1/1656 |

FOREIGN PATENT DOCUMENTS

| | | |
|---|---|---|
| DE | 202021102972 U1 | 8/2021 |
| JP | 7223874 B2 | 2/2023 |
| KR | 10-2021-0132272 A | 11/2021 |

\* cited by examiner

DISPLAY DEVICE

CROSS-REFERENCE TO RELATED APPLICATIONS

This application claims the priority of Korean Patent Application No. 10-2022-0157403 filed on Nov. 22, 2022, in the Korean Intellectual Property Office, the entire contents of which are incorporated herein by reference.

BACKGROUND

Technical Field

The present disclosure relates to a display device, and more particularly, but not exclusively, to a display device in which damage to a corner portion of the display panel is reduced.

Description of the Related Art

Recently, display devices, which process and display a large amount of information, have been rapidly developed in accordance with the full-fledged entry into the information era. As display devices used for a monitor of a computer, a TV set, a mobile phone, and the like, there are an organic light-emitting display (OLED), and a liquid crystal display (LCD).

The range of application of such display devices is diversified from the monitor of the computer and the TV set to personal mobile devices, and studies are being conducted on the display devices having wide display areas and having reduced volumes and weights.

In particular, recently, flexible display devices, which are manufactured to be able to display images even when being bent or folded like paper, have attracted attention as next-generation display devices. However, flexible display devices have a number of challenges.

For example, known foldable display devices cannot be smoothly contracted because of contraction deformation occurring on a structure for supporting a shape of a bending area of the display panel, which causes a problem in which creases are formed, damage occurs, and display quality of the display panel deteriorates.

BRIEF SUMMARY

According to one or more embodiments of the present disclosure, a display device is provided that includes bending areas including corners.

According to one or more embodiments of the present disclosure is to provide a display device in which creases of the display panel, which may occur on a corner of the display device, may be suppressed.

According to one or more embodiments of the present disclosure is to provide a display device in which damage to a corner portion, to which a large amount of stress is applied, is suppressed.

According to one or more embodiments of the present disclosure, there is provided a display device. The display device comprises a display panel including a non-bending area and bending areas, and a metal plate disposed on a lower portion of the display panel and configured to support the display panel, wherein the bending areas comprise first bending areas corresponding to a lateral portion of the non-bending area, and second bending areas corresponding to a corner of the non-bending area, wherein the metal plate comprises a first metal plate disposed in the non-bending area, a second metal plate disposed to correspond to the first bending areas, and a third metal plate disposed to correspond to the second bending areas, wherein a groove is disposed in the second metal plate, and wherein the third metal plate comprises a plurality of opening portions.

According to one or more embodiments of the present disclosure, there is provided a display device. The display device comprises a display panel including a non-bending area and bending areas, and a top plate disposed on a lower portion of the display panel, wherein the bending areas comprise first bending areas corresponding to a lateral portion of the non-bending area and second bending areas corresponding to a corner of the non-bending area, wherein the top plate comprises a first top plate disposed in the non-bending area, a second top plate disposed to correspond to the first bending areas, and a third top plate disposed to correspond to the second bending areas, and wherein the third top plate is made of a material that is deformed in a direction different from a direction in which the second top plate is deformed when heat is applied.

The flexible display devices may be classified into an unbreakable display device having high durability and using a plastic thin-film transistor substrate instead of a glass substrate, a bendable display device capable of being bent without being broken, a rollable display device capable of being rolled circularly, and a foldable device capable of being folded. These flexible display devices may have spatial utilization and advantageous interior and design and be applied to various application fields.

According to the present disclosure, a groove or hole may be disposed on a metal plate, thereby reducing stress generated in bending areas.

In addition, according to the present disclosure, a backplate, which has a thermal contraction ratio that varies depending on bending areas, may be disposed, thereby reducing stress caused by bending.

Embodiments of the present disclosure are not limited to the above-mentioned embodiments, and other embodiments, which are not mentioned above, can be clearly understood by those skilled in the art from the following descriptions. Other detailed matters of the embodiments of the disclosure are included in the following detailed description and the accompanying drawings. The benefits and advantages of the embodiments of the present disclosure are not limited to the contents above, and more various benefits and advantages are apparent from a review of the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
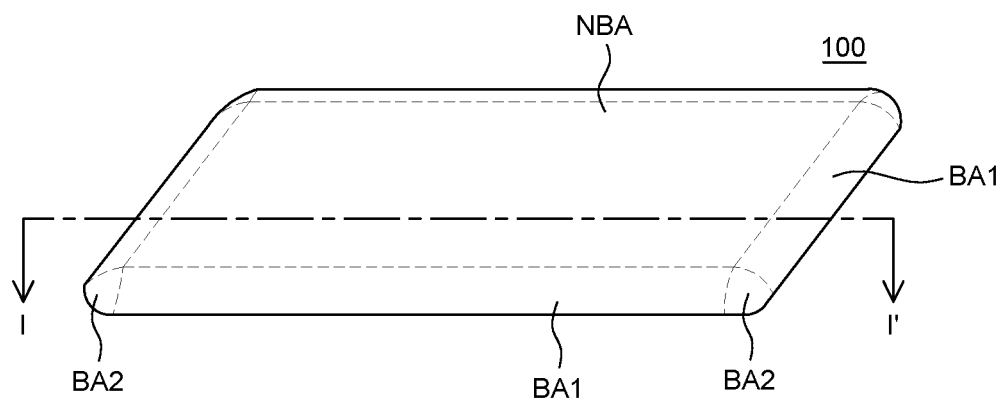
FIG. 1 is a schematic perspective view of a display device according to an embodiment of the present disclosure.

Advantages and characteristics of the present disclosure and a method of achieving the advantages and characteristics will be clear by referring to the embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including." "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to one or more embodiments of the present disclosure will be described in detail with reference to accompanying drawings.

Figure 2:
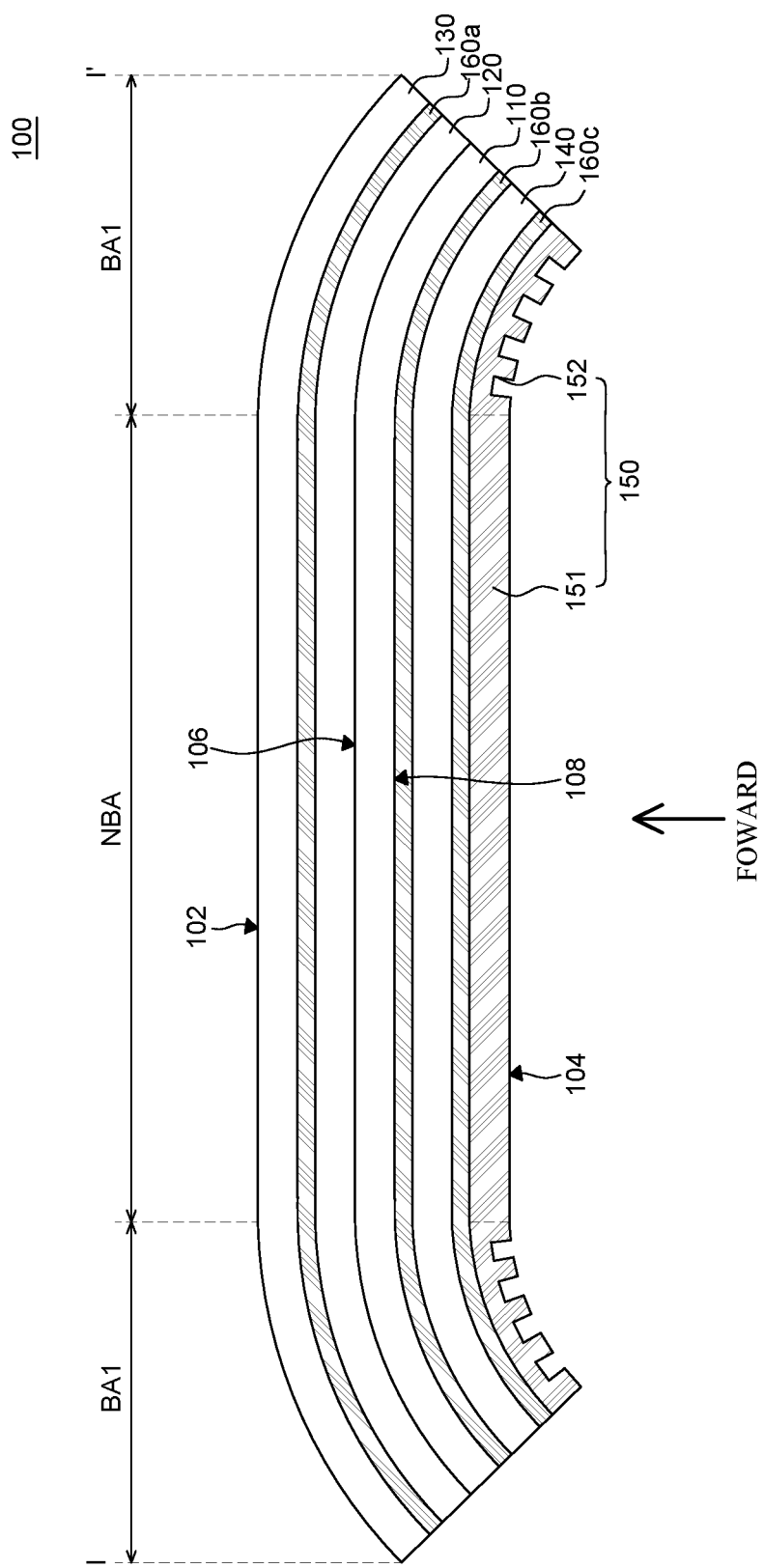
FIG. 2 is a schematic cross-sectional view of the display device of FIG. 1 along line I-I' in FIG. 1.

FIG. 1 is a schematic perspective view of a display device 100 according to an embodiment of the present disclosure. FIG. 2 is a schematic cross-sectional view of the display device 100 along line I-I' in FIG. 1.

With reference to FIGS. 1 and 2, the display device 100 includes a display panel 110, a polarizing film 120, a cover window 130, a backplate 140, and a metal plate 150.

The display panel 110 is a panel for implementing or displaying images. Display elements for implementing or displaying images, circuit parts for operating the display elements, and the like may be disposed on the display panel 110. For example, in case that the display device 100 is an organic light-emitting display device, the display elements may include an organic light-emitting element. Hereinafter, for convenience of description, it is assumed that the display device 100 is a display device including an organic light-emitting element. However, the present disclosure is not limited thereto.

The circuit part may include various thin-film transistors, capacitors, lines, drive ICs, and the like for operating the organic light-emitting elements. For example, the circuit parts may include various components such as drive thin-film transistors, switching thin-film transistors, storage capacitors, gate lines, data lines, gate driver ICs, and data drivers IC. However, the present disclosure is not limited thereto.

The display panel 110 can be made by forming the drive thin-film transistors and the light-emitting elements on a flexible substrate and sealing (encapsulating) the flexible substrate with a sealing part. The display panel 110 may include a flexible substrate having a very small thickness for implementing flexibility, and a display element disposed on the flexible substrate.

The flexible substrate may be made of an insulating material having flexibility. For example, the flexible substrate may be an insulating plastic substrate made of a material selected from polyimide, polyether sulfone, polyethylene terephthalate, and polycarbonate. Certain features of the display panel 110 described above are not shown in the figures to avoid obscuring the concepts of the disclosure. In general, the display panel 110 can be implemented using a variety of techniques and hardware, including those described above and others.

With reference to FIGS. 1 and 2, the display panel 110 may include a non-bending area NBA and bending areas BA.

The non-bending area NBA is an area in which the display panel 110 is kept in a flat state. The entire non-bending area NBA may include a display area. Alternatively, the non-bending area NBA may include a display area, and a non-display area configured to at least partly surround the display area. However, the present disclosure is not limited thereto.

The bending areas BA are areas in which the display panel 110 is bent or is capable of being bent. The bending areas BA may be areas extending from lateral portions and corners of the non-bending area NBA, as best shown in FIG. 1. In some embodiments, all or some of the bending areas BA may be configured as the display areas. A partial area of the bending areas BA may be configured as the non-display area. However, the present disclosure is not limited thereto.

The bending areas BA include first bending areas BA1 corresponding to the lateral portions of the non-bending area NBA, and second bending areas BA2 corresponding to the corners of the non-bending area NBA. Thus, the first bending areas BA1 may extend along lateral sides of the non-bending area NBA and connect successive second bending areas BA2 positioned at the corners of the display panel 100. Except as otherwise noted, each first bending area BA1 is associated with two second bending areas BA2 at opposite ends of each first bending area BA1 in a generally quadrangular shape. In some embodiments, the display device 100 may have a different shape than square or rectangular and still benefit from the techniques described herein.

First, the first bending areas BA1 are disposed to correspond to the lateral portion of the non-bending area NBA. That is, the first bending areas BA1 is an area extending from the lateral portion of the non-bending area NBA. As illustrated in FIG. 1, in case that the non-bending area NBA has a quadrangular shape, the first bending areas BA1 may be areas extending from four sides of the non-bending area NBA and bent with a particular radius of curvature. For example, the first bending areas BA1 may be bent with a compound curvature at a level of about 5 mm to 8 mm.

Next, the second bending areas BA2 are disposed to correspond to corners of the non-bending area NBA. That is, the second bending areas BA2 is an area extending from the corner of the non-bending area NBA. As illustrated in FIG. 1, in case that the non-bending area NBA has a quadrangular shape, the second bending areas BA2 may be areas extending from four corners of the non-bending area NBA and bent with a particular radius of curvature. For example, the second bending areas BA2 may be bent with a compound curvature at a level of about 5 mm to 8 mm. The radius of curvature of the first and second bending areas BA1, BA2 is preferably similar to provide a uniform shape to the display panel 110. However, the concepts of the disclosure enable the bending areas BA1, BA2 to be selected and they may differ from each other.

The first bending areas BA1 and the second bending areas BA2 may be alternately disposed to surround the non-bending area NBA. That is, the second bending area BA2 may be disposed between the two first bending areas BA1, and the first bending areas BA1 may be disposed between the two second bending areas BA2.

Meanwhile, the display device 100 according to an embodiment of the present disclosure may include the display area and the non-display area. The display area is an area in which a plurality of pixels is disposed to substantially display images. The non-display area may be positioned to surround the display area. The non-display area is an area in which no image is substantially displayed. Various lines, a drive IC, a printed circuit board, and the like are disposed to operate the pixel and a drive circuit disposed in the display area. For example, various ICs, such as a gate driver IC and a data driver IC, a VSS line, and the like may be disposed in the non-display area. Some of these aspects are not illustrated to avoid obscuring the concepts of the disclosure.

The directions in the drawings are defined with reference to FIG. 2. Assuming that a display surface of the display device 100 is directed forward, the polarizing film 120 and the cover window 130 are positioned in a direction of a display surface 102 of the display device 100, and the backplate 140 and the metal plate 150 are positioned in a direction of a rear surface 104 of the display device 100. The above elements of the display device 100 are attached by bonding agents 160a, 160b, and 160c in sequential order in some embodiments. The display surface 102 and rear surface 104 may be the outermost surfaces of the display device 100 in one or more embodiments.

A thermosetting bonding agent or thermoplastic bonding agent may be used for the bonding agents 160a, 160b, and 160c. Therefore, the bonding agents 160a, 160b, and 160c may have different physical properties depending on thermal reactions. In particular, a modulus of elasticity may be changed by heat, and fluidity may be controlled. For example, materials that harden and remove fluidity upon cooling or curing may be used for the bonding agents 160a, 160b, and 160c. Meanwhile, in case that a material, which has physical properties that are hardly changed by heat, is used for the bonding agent, it is difficult to control modulus of elasticity and fluidity, which may cause a problem in which the constituent elements disposed on upper and lower portions of the bonding agent are separated. For example, in case that a material having fluidity is used for the bonding agent and a metal plate adjoins one surface of the bonding agent, the metal plate may be separated by a repulsive force that returns the metal plate to its shape prior to the metal plate is bent. Therefore, materials whose modulus of elasticity varies depending on temperature, may preferably be used for the bonding layers 160a, 160b, and 160c, thereby suppressing the separation of the metal plate 150, although the present disclosure contemplates a number of different bonding agents, including those with less preferable characteristics noted above.

The polarizing film 120 is disposed on the display panel 110. The polarizing film 120 polarizes, at a polarization angle, light emitted from the display panel 110. The polarizing film 120 discharges the light polarized at a polarization angle to the outside or in a direction of the display surface 102. The polarizing film 120 may include a function of blocking the reflection of light beams, except for the light beams polarized at a polarization angle, among light beams from the outside or external to the display device 100. Meanwhile, FIG. 2 illustrates that the display device 100 includes the polarizing film 120. However, the polarizing film 120 may be excluded in accordance with various design factors and is therefore optional in some embodiments.

The cover window 130 is disposed on an upper portion of the display panel 110 to suppress damage, such as scratches, and protect the display panel 110 from external impact. The cover window 130 may be made of a flexible plastic-based material that is bendable to implement the thin and flexible display device 100. In an embodiment, the cover window 130 is the outermost layer of the display device 100.

Meanwhile, although not illustrated in FIG. 2, a touch panel, which selectively implements a touch sensor, as necessary, may optionally be disposed between the display panel 110 and the cover window 130.

The rear surface 104 of the display panel 110 may include the backplate 140 for supporting the display panel 110. The backplate 140 may be referred to as a top plate because the backplate 140 is one of the two plates, along with metal plate 150, disposed on the rear surface 104 of the display panel 110, and the backplate 140 is disposed at the upper side of the metal plate 150 relative to the display surface 102 and rear surface 104. The backplate 140 may be made of a polyethylene terephthalate (PET) based material, although other materials are comtemplated.

The backplate 140 may maintain a constant curvature of the display panel 110 and suppress the occurrence of crease on a top surface 106 of the display panel 110 when the display device 100 is bent. In addition, the backplate 140 may be disposed between the display panel 110 and the metal plate 150 and inhibit a plurality of opening portions of the metal plate 150 from being visible to a display screen or suppress distortion of the display screen caused by the plurality of opening portions.

The metal plate 150 is disposed on the rear surface of the backplate 140 to support the display panel 110. In this case, the metal plate 150 supports a flexible substrate, which constitutes the display panel 110, so that the flexible substrate does not sag. The metal plate 150 protects the constituent elements disposed on the flexible substrate from outside moisture, heat, impact, or the like, in addition to the other advantages described herein.

The metal plate 150 may be referred to as a bottom plate because the metal plate 150 is one of the two plates, along with the back plate 140, disposed on a rear surface 108 of the display panel 110, and the metal plate 150 is disposed at the lower side relative to the display surface 102 and rear surface 104 of the display device 100. The metal plate 150 may be made of a material such as stainless steel (SUS) and/or amorphous metal having rigidity to maintain a shape of the display panel 110, among other suitable materials.

The metal plate 150 may include a first metal plate portion 151 (which may also be referred to herein as a first metal plate 151), a second metal plate portion 152 (which may also be referred to herein as a second metal plate 152), and a third metal plate portion 153 (which may also be referred to herein as a third metal plate 153). The metal plate 150 will be described in more detail with reference to FIGS. 3 to 4B.

Figure 3:
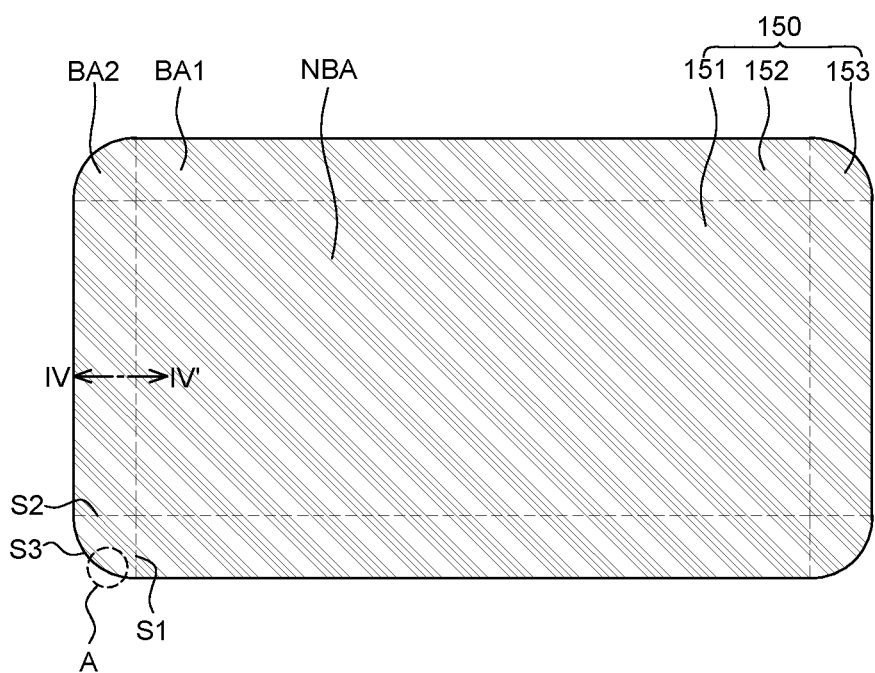
FIG. 3 is a schematic top plan view of a metal plate of the display device of FIG. 1.
Figure 4A:
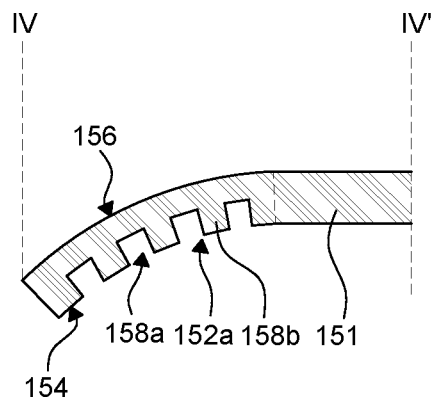
FIG. 4A is a cross-sectional view of the metal plate of FIG. 3 taken along line IV-IV' in FIG. 3.
Figure 4B:
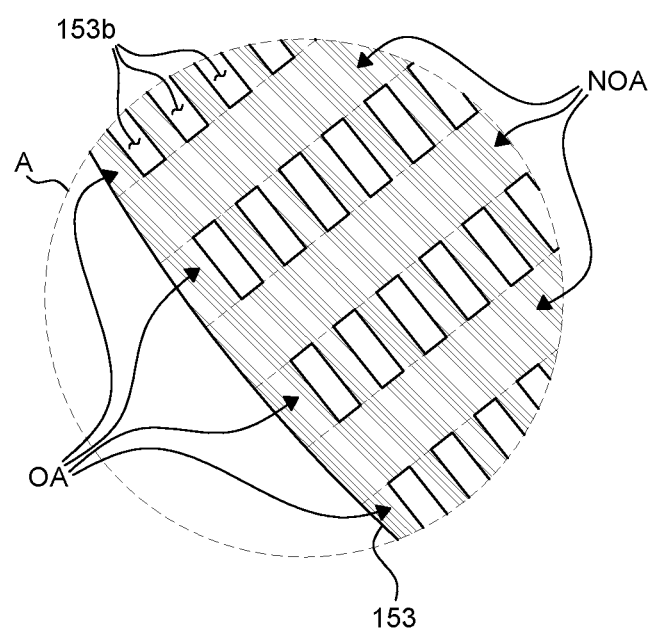
FIG. 4B is an enlarged perspective view of area A in FIG. 3.

FIG. 3 is a schematic top plan view illustrating one or more embodiments of the metal plate 150 of the display device 100 according to the present disclosure. FIG. 4A is a cross-sectional view taken along line IV-IV' in FIG. 3. FIG. 4B is an enlarged perspective view of area A in FIG. 3.

With reference to FIG. 3, the metal plate 150 includes the first metal plate 151, the second metal plate 152, and the third metal plate 153. In an embodiment, the first, second, and third metal plates are a single, continuous, unitary layer with "first," "second," and "third" used for convenience to assist with explaining and understanding the concepts of the disclosure.

The first metal plate 151 may be referred to as a first bottom plate and may be disposed at a position corresponding to the non-bending area NBA of the display device 100. Therefore, as illustrated in FIG. 1, the first metal plate 151 may be disposed in a shape corresponding to the non-bending area NBA and provided on a lower portion of the display panel 110 including the non-bending area NBA. In an embodiment, the first metal plate 151 has a quadrangular shape corresponding to the shape of the non-bending area NBA. The first metal plate 151 may be disposed at a central portion of the metal plate 150 and have a flat top surface.

The second metal plate 152 may be referred to as a second bottom plate and may be disposed at a position corresponding to the first bending areas BA1. That is, the second metal plate 152 may extend from a lateral portion of the first metal plate 151. As illustrated in FIG. 3, in case that the first metal plate 151 has a quadrangular shape, the second metal plates 152 may extend from four sides of the first metal plate 151. Therefore, the second metal plates 152 may be disposed to surround side surfaces of the first metal plate 151.

The third metal plate 153 may be referred to as a third bottom plate and may be disposed in an area corresponding to the second bending areas BA2. Therefore, the third metal plate 153 may be disposed in an area corresponding to a corner of the first metal plate 151 and extend from the corner of the first metal plate 151. As illustrated in FIG. 3, in case that the first metal plate 151 has a quadrangular shape, the third metal plates 153 may extend from four corners of the first metal plate 151. In addition, the third metal plate 153 may be disposed between and coupled to the second metal plates 152.

With reference to FIG. 3, the third metal plate 153 may include a first side surface S1, a second side surface S2, and a third side surface S3 configured to connect the first side surface S1 and the second side surface S2. The first side surface S1 and the second side surface S2 may be connected to the side surface of the second metal plate 152. Referring to the third metal plate 153 disposed at a left lower end of the metal plate 150 in the orientation of FIG. 3 as a non-limiting example, the third metal plate 153 may include the first side surface S1 connected to the side surface of the second plate 152 disposed to the right of the third metal plate 153, and the second side surface S2 connected to the side surface of the second plate 152 disposed at the upper side of the third metal plate 153. In addition, the third metal plate 153 may include the third side surface S3 having a curved shape and configured to connect the first side surface S1 and the second side surface S2. However, the shape of the third side surface S3 is not limited thereto.

In an embodiment, a distance between the first side surface S1 and the second side surface S2 may increase as the distance from the corner of the first metal plate 151 increases. With reference to FIG. 3, the first side surface S1 and the second side surface S2 may be connected to each other at the corner of the first metal plate 151. The distance between the first side surface S1 and the second side surface S2 may increase as the distance from the third side surface S3 decreases. In other words, in the preferred configuration of the metal plate 150 described herein, the third metal plate 153 is a fan shape with two flat and rectilinear sides and a curved hypotenuse. The flat and rectilinear sides meet each other at a right angle at the corner of the first metal plate 151. Thus, as the distance from the first metal plate 151 increases, the distance between the first and second side surfaces S1, S2 decreases with the greatest distance between the first and second side surfaces S1, S2 being proximate the third side surface S3.

The first metal plate 151, the second metal plate 152, and the third metal plate 153 may be integrated. For example, the first metal plate 151, the second metal plate 152, and the third metal plate 153 may be configured as a single body and made of the same material. However, the present disclosure is not limited thereto. The first metal plate 151, the second metal plate 152, and the third metal plate 153 may be formed separately from one another, and then connected to one another using a variety of techniques.

With reference to FIGS. 4A and 4B, the metal plate 150 used for the display device 100 according to one or more embodiments of the present disclosure may include a plurality of grooves 152a and a plurality of opening portions 153b respectively provided in and corresponding to the first bending areas BA1 and the second bending areas BA2 so that the bent shapes may be maintained in the first bending areas BA1 and the second bending areas BA2.

First, the plurality of grooves 152a may be disposed on a bottom surface 154 of the second metal plate 152. With reference to FIG. 4A, the plurality of grooves 152a each having a shape recessed in a direction from the bottom surface to a top surface 156 of the second metal plate 152. Meanwhile, the present disclosure is not limited thereto, and the plurality of grooves 152a may each have a shape recessed in a direction from the top surface to the bottom surface of the second metal plate 152.

With reference to FIG. 4A, the plurality of grooves 152a may be disposed in one direction. For example, the plurality of grooves 152a may be disposed in the same direction as the corner of the first metal plate 151. Meanwhile, an interval between the plurality of grooves 152a may vary depending on positions. For example, the interval between the plurality of grooves 152a may decrease as the distance from the first metal plate 151 increases. Other configurations are contemplated, such as the distance or interval between the grooves 152a being the same or increasing as the distance from the first metal plate 151 increases. Each groove 152a may be implemented as a cavity or channel 158a between successive protrusions or ridges 158b that have the benefits and advantages described herein.

Next, with reference to FIG. 4B, the third metal plate 153 may include a plurality of opening areas OA in which the plurality of opening portions 153b is disposed, and a plurality of non-opening areas NOA disposed between the plurality of opening areas OA. The plurality of opening areas OA may be defined as areas in which the plurality of opening portions 153b is disposed. The plurality of non-opening areas NOA may be defined as areas in which the plurality of opening portions 153b is not disposed. The plurality of opening areas OA and the plurality of non-opening areas NOA may each have a shape extending from the corner of the first metal plate 151. However, the present disclosure is not limited thereto. In the illustrated embodiment, the plurality of opening areas OA may generally be arranged in spaced apart columns extending from the corner or edge of the first metal plate 151. The plurality of opening portions 153b may be holes or openings with a selected shape and configuration within the plurality of opening areas OA. In a non-limiting example, the plurality of opening portions 153b are holes arranged in spaced apart rows along the columns of the opening areas OA.

In addition, in the plurality of opening areas OA, a longitudinal direction of the plurality of opening portions 153b may intersect a direction in which the third metal plate 153 is bent. For example, the longitudinal direction of the plurality of opening portions 153b may be perpendicular to the direction in which the third metal plate 153 is bent. However, the present disclosure is not limited thereto.

In addition, FIG. 4B illustrates that the plurality of opening portions 153b each have a quadrangular shape. The shape of each of the plurality of opening portions 153b is not limited thereto.

In one or more embodiments, the plurality of opening areas OA and the plurality of non-opening areas NOA may extend in the direction in which the third metal plate 153 is bent. That is, the longitudinal direction of the plurality of opening areas OA and the plurality of non-opening areas NOA may correspond to the direction in which the third metal plate 153 is bent.

Recently, in order to increase a proportion of the display area of the display device and provide various product designs, it has been discovered that a display device having a planar non-bending area and curved bending areas made by bending a part of the display panel into a particular shape during a manufacturing process is advantageous. In particular, it would be advantageous to have a display device that is bent not only to sides of surface but also to areas corresponding to corners. A display device with such a design may be able to display images along the sides of the display device, as well as at the corners.

Meanwhile, in the case of the display device that is bent to the corners of the display panel, compressive stress may be applied to a corner area of the display panel. Specifically, in case that the flat metal plate is bent to have curved surfaces, contraction deformation may occur in a bending direction. In particular, a contraction deformation amount in the area corresponding to the corners of the display device may be larger than a contraction deformation amount of the area of the lateral portion of the display device. Therefore, compressive stress may be generated in several directions in the corner area of the display panel, and relatively high compressive stress may be applied to the corner area in comparison with the other bending areas. As a result, it is a challenge to smoothly contract the corner areas of the display panel, and bending at the corners may cause creases or damage to the corner area of the display panel.

Therefore, in the display device 100 according to one or more embodiments of the present disclosure, the metal plate 150 having the plurality of opening portions 153b may be disposed in the bending areas BA corresponding to the corner, thereby reducing stress caused by bending of the corner. The third metal plate 153 corresponding to the second bending areas BA2 positioned at the corner of the display panel 110, among the metal plates 150, may include the plurality of opening portions 153b. Therefore, in case that compressive stress is applied to the corner of the display panel 110, the opening portion 153b of the third metal plate 153 is contracted, meaning that the openings 153b deform to absorb concentrations of stress at the corners and enable the metal plate 150 to be smoothly bent at the corners without creases or other damage to the display panel 110. That is, the plurality of opening portions 153b of the third metal plate 153 absorbs compressive stress applied to the corner area of the display panel 110, such that the plurality of opening portions 153b may be deformed and contracted. Therefore, in the display device 100 according to one or more embodiments of the present disclosure, it is possible to suppress a situation in which the display panel 110 is creased or the display panel 110 is damaged by compressive stress applied to the second bending areas BA2 at the corner of the display panel 110.

The grooves 152a in the second metal plate 152 may perform a similar function for the bending of the display panel along sides of the display device. However, as noted, the concentration of stress along the sides of the display device 100 and display panel 110 may be comparatively less than the stress at the corners. As a result, the grooves 152a and the second metal plate 152 generally may have a different design and configuration than the third metal plate 153 and the opening portions 153b. In particular, the grooves 152a may be channels that are connected to each other by sections of the second metal plate 152, while the opening portions 153b of the third metal plate 153 may be openings or holes. The portions of the second metal plate 152 that connect the grooves 152a may increase the rigidity of the second metal plate 152 to better support and protect the display panel 110, while also decreasing the stress absorption capability of the second metal plate 152. On the other hand, the third metal plate 153 is better able to absorb and dissipate stress because the opening portions 153b reduce the rigidity of the third metal plate 153 and enable deformation of the third metal plate 153b under concentration stress at the corners. As a result, the third metal plate 153 enables smooth bending of the corners of the display panel 110 while also preventing damage to the display panel 110 as a result of the concentration of stress at the corners.

Figure 5:
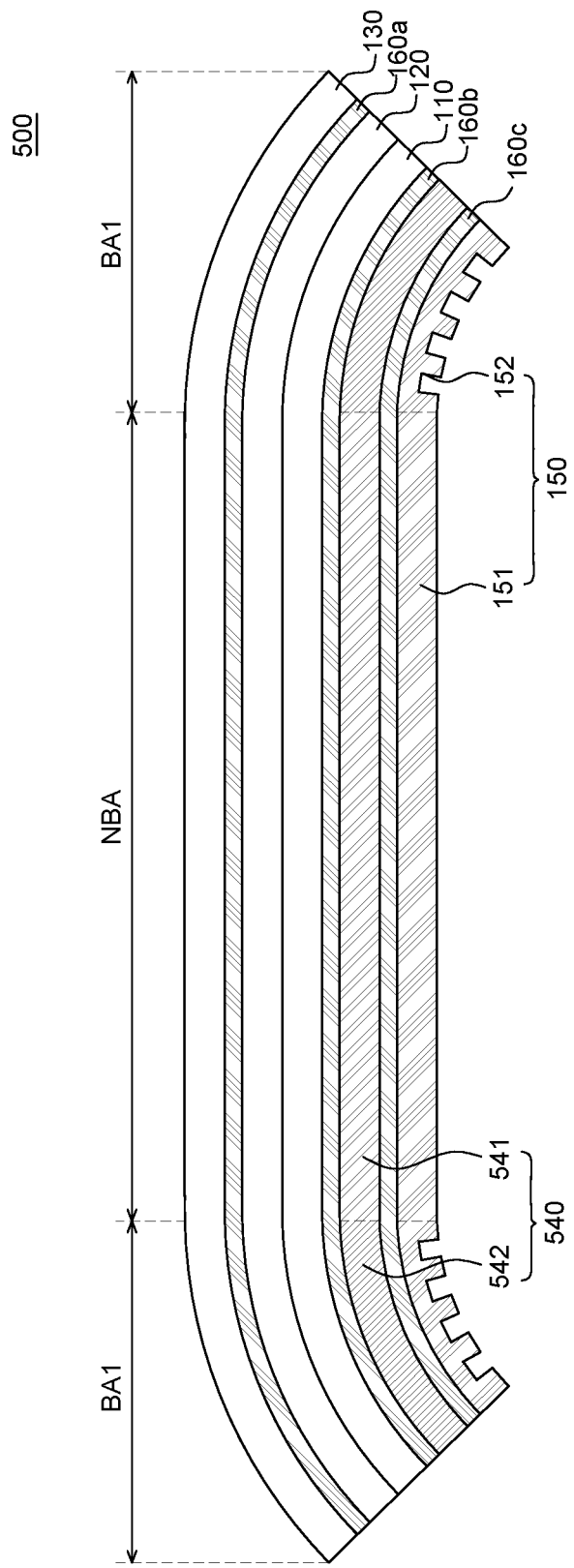
FIG. 5 is a schematic cross-sectional view of an embodiment of a display device according to the present disclosure.
Figure 6:
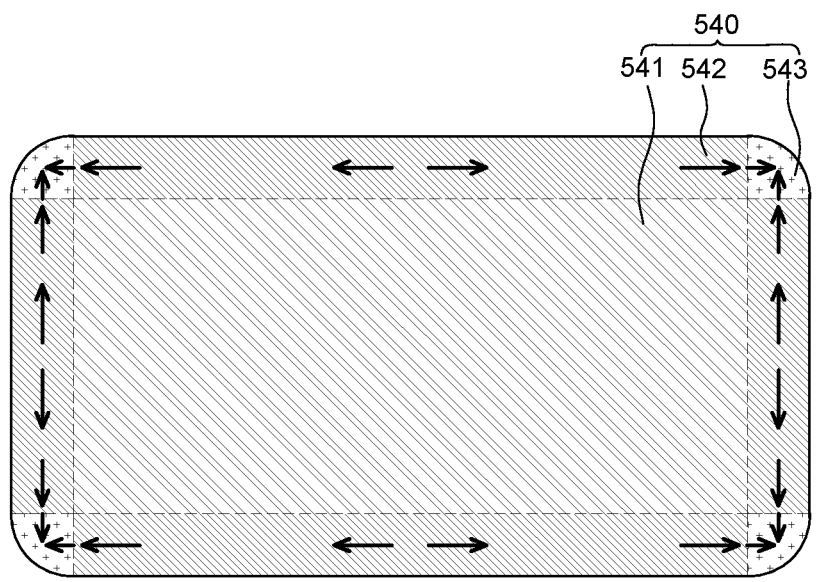
FIG. 6 is a schematic top plan view of a backplate of the display device of FIG. 5.

FIG. 5 is a schematic cross-sectional view of a display device 500 according to one or more embodiments of the present disclosure. FIG. 6 is a schematic top plan view of a backplate 540 of the display device 500. The display device 500 illustrated in FIG. 5 is substantially identical in configuration to the display device 100 illustrated in FIGS. 1 to 4, except for the backplate 540. Therefore, repeated descriptions of the identical components will be omitted.

With reference to FIGS. 5 and 6, the backplate 540 includes a first backplate 541, a second backplate 542, and a third backplate 543.

The first backplate 541 may be referred to as a first top plate and may be disposed at a position corresponding to the non-bending area NBA of the display device 500. Therefore, in an embodiment where the first metal plate 151 has a quadrangular shape, the first backplate 541 may be disposed to correspond to the first metal plate 151. The first backplate 541 may be disposed at a central portion of the backplate 540 and have a flat top surface.

The second backplate 542 may be referred to as a second top plate and may be disposed at a position corresponding to the second metal plate 152. That is, the second backplate 542 may extend from a lateral portion of the first backplate 541. As illustrated in FIG. 6, in case that the first backplate 541 has a quadrangular shape, the second backplates 542 may extend from four sides of the first backplate 541. Therefore, the second backplates 542 may be disposed to surround side surfaces of the first backplate 541.

The third backplate 543 may be referred to as a third top plate and may be disposed in an area corresponding to the third metal plate 153. Therefore, the third backplate 543 may be disposed in an area corresponding to a corner of the first backplate 541 and extend from the corner of the first backplate 541. As illustrated in FIG. 6, in case that the first backplate 541 has a quadrangular shape, the third backplates 543 may extend from four corners of the first backplate 541. In addition, the third backplate 543 may be disposed between the second backplates 542.

The first backplate 541, the second backplate 542, and the third backplate 543 may be integrated. For example, all the first backplate 541, the second backplate 542, and the third backplate 543 may be formed as a single body by a single process. However, the present disclosure is not limited thereto. The first backplate 541, the second backplate 542, and the third backplate 543 may be formed separately from one another, and then coupled to one another.

The first backplate 541, the second backplate 542, and the third backplate 543 may be made of a polyethylene terephthalate (PET) based material. In this case, the first backplate 541, the second backplate 542, and the third backplate 543 may be made of polyethylene terephthalate (PET) based materials having different compositions.

The second backplate 542 and the third backplate 543 may have different coefficients of thermal expansion from each other, and both of which may be different from the first back plate 541.

The second backplate 542 may be made of a material that expands when heat is applied. For example, the second backplate 542 may have an expansion ratio of 1%. In this case, the expansion ratio of 1% may mean that an overall length increases by 1% when heat is applied from 25° C. to 90° C. Therefore, as illustrated in FIG. 6, when heat is applied to the second backplate 542 from 25° C. to 90° C., the second backplate 542 may expand in a direction toward the third backplate 543, meaning toward an area bent from the corner of the first backplate 541.

The third backplate 543 may be made of a material that contracts when heat is applied. In this case, the third backplate 543 may be made of a material having the same or a corresponding deformation amount as the material of the second backplate 542, or made of a material having a larger deformation amount than the material of the second backplate 542 when heat is applied from 25° C. to 90° C. For example, the third backplate 543 may have a contraction ratio of 1% or 5%. In such a non-limiting example, the contraction ratio of 1% may mean that an overall length decreases by 1% when heat is applied from 25° C. to 90° C. to counteract the expansion of the third backplate 543.

In the display device 500, a hot press process, which applies heat during a manufacturing process, is performed to expand or contract the second backplate 542 and the third backplate 543 under heat.

Specifically, when the display panel 110 is manufactured, the backplate 540 is attached to the bottom surface of the display panel 110, and then the metal plate 150 is attached.

Next, portions of the outer peripheral portions of the display panel 110, the backplate 540, and the metal plate 150, are removed by a laser trimming process.

Next, the bending areas BA is bent as heat is applied to the backplate 540 during the hot press process. Specifically, the display panel 110, the backplate 540, and the metal plate 150 are disposed on a lower structure having a shape corresponding to the bending areas BA, an upper structure is pressed from above, and heat is applied.

As described above, in case that heat is applied to the second backplate 542 and the third backplate 543, the third backplate 543 may be deformed in a direction different from a direction in which the second backplate 542 is deformed. For example, as illustrated in FIG. 6, the third backplate 543 may be contracted in a direction toward the center of the third backplate 543 when heat is applied, and the second backplate 542 may be expanded in a direction from the center of the second backplate 542 to the outer periphery of the second backplate 542 when heat is applied. Therefore, as the third backplate 543 is contracted while corresponding to the expansion of the second backplate 542, it is possible to suppress creases that may occur on the corner of the display panel 110 disposed on the third backplate 543 during manufacturing of the display device 500.

After the hot press process is completed, the polarizing film 120 and the cover window 130 may be disposed on the upper portion of the display panel 110.

In the display device 500, the metal plate 150 having the plurality of opening portions 153b may be disposed in the bending areas BA corresponding to the corner, thereby reducing stress caused by bending occurring on the corner during such manufacturing processes. Further, it is possible to suppress a situation in which the display panel 110 is creased or the display panel 110 is damaged by compressive stress applied to the second bending areas BA2 of the display panel 110.

In addition, in the display device 500, the backplate 540 may have a thermal contraction ratio that varies depending on the bending areas BA, thereby reducing stress generated on the display panel 110. For example, the second backplate 542 may be made of a material that expands when heat is applied, and the third backplate 543 may be made of a material that contracts when heat is applied. In addition, the heat may be applied through the hot press process before the cover window 130 is attached to the display panel 110 to which the metal plate 150 and the backplate 540 are attached. Therefore, the second backplate 542 may expand in a direction toward the corner of the display device 500, and the third backplate 543 may contract in the direction toward the center or away from the corner of the display device 500. Therefore, the second backplate 542 and the third backplate 543 may reduce stress generated by contraction deformation occurring on the second bending areas BA2, and suppress the occurrence of creases on the top surface of the display panel 110. Thus, the present disclosure contemplates a combination of material and hardware techniques to compensate for stress that occurs as a result of manufacturing, as well as the related methods of manufacturing such display devices.

Figure 7:
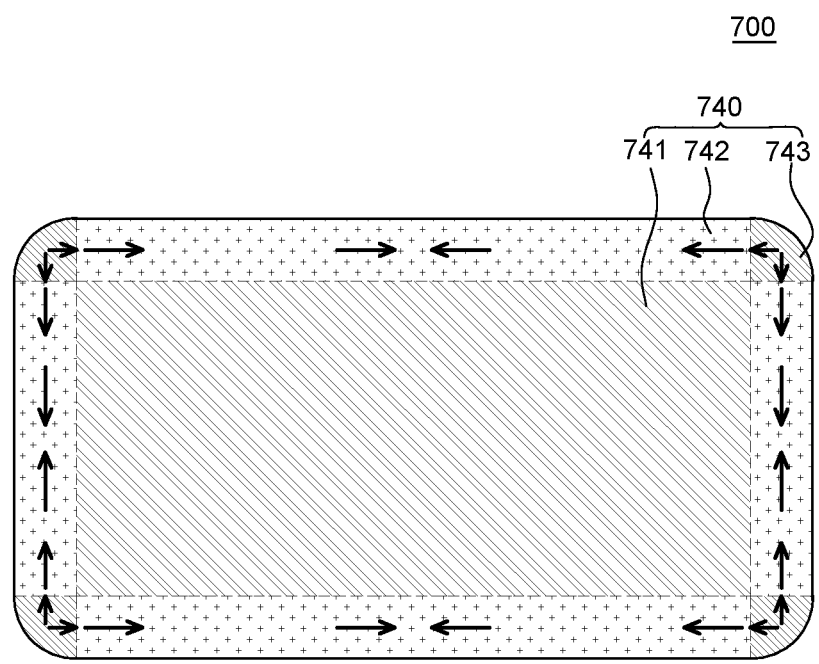
FIG. 7 is a schematic top plan view of a backplate of an embodiment of a display device according to the present disclosure.

FIG. 7 is a schematic top plan view of a backplate 740 of a display device 700 according to one or more embodiments of the present disclosure. The display device 700 illustrated in FIG. 7 is substantially identical in configuration to the display device 500 illustrated in FIGS. 5 and 6, except for the backplate 740. Therefore, repeated descriptions of the identical components will be omitted.

With reference to FIG. 7, the backplate 740 includes a first backplate 741, a second backplate 742, and a third backplate 743.

The first backplate 741 may be disposed at a position corresponding to the non-bending area NBA of the display device 700. Therefore, the first backplate 741 may be disposed at a central portion of the backplate 740 and have a flat top surface.

The second backplate 742 may be disposed at a position corresponding to the second metal plate 152. That is, the second backplates 742 may extend from lateral portions of the first backplate 741 and be disposed to surround side surfaces of the first backplate 741.

The third backplate 743 may be disposed in an area corresponding to the third metal plate 153. Therefore, the third backplates 743 may extend from four corners of the first backplate 741. In addition, the third backplate 743 may be disposed between the second backplates 742.

The first backplate 741, the second backplate 742, and the third backplate 743 may be integrated. For example, all the first backplate 741, the second backplate 742, and the third backplate 743 may be formed as a single body by a single process. However, the present disclosure is not limited thereto. The first backplate 741, the second backplate 742, and the third backplate 743 may be formed separately from one another, and then coupled to one another.

The first backplate 741, the second backplate 742, and the third backplate 743 may be made of a polyethylene terephthalate (PET) based material. In this case, the first backplate 741, the second backplate 742, and the third backplate 743 may be made of polyethylene terephthalate (PET) based materials having different compositions. The second backplate 742 and the third backplate 743 may have different coefficients of thermal expansion.

The second backplate 742 may be made of a material that contracts when heat is applied. For example, the second backplate 742 may have a contraction ratio of 1%. That is, when heat is applied from 25° C. to 90° C., an overall length of the second backplate 742 may decrease by 1%. Therefore, as illustrated in FIG. 7, when heat is applied to the second backplate 742 from 25° C. to 90° C., the second backplate 742 may contract in a direction of the center of the second backplate 742.

The third backplate 743 may be made of a material that expands when heat is applied. The third backplate 743 may have an expansion ratio of 1% or 5%. That is, when heat is applied from 25° C. to 90° C., an overall length of the third backplate 743 may increase by 1% or 5%.

In the display device 700 according to still another embodiment of the present disclosure, a hot press process, which applies heat during a manufacturing process, is performed to expand or contract the second backplate 742 and the third backplate 743 under applied heat.

Specifically, when the display panel 110 is manufactured, the backplate 740 is attached to the bottom surface of the display panel 110, and then the metal plate 150 is attached.

Next, portions of the outer peripheral portions of the display panel 110, the backplate 740, and the metal plate 150 are removed by a laser trimming process.

Next, the bending areas BA is bent as heat is applied to the backplate 740 during the hot press process. Specifically, the display panel 110, the backplate 740, and the metal plate 150 are disposed on a lower structure having a shape corresponding to the bending areas BA, an upper structure is pressed from above, and heat is applied.

Therefore, in case that heat is applied to the second backplate 742 and the third backplate 743, the third backplate 743 may be deformed in a direction different from a direction in which the second backplate 742 is deformed. For example, as illustrated in FIG. 7, the third backplate 743 may be expanded in a direction from the center to the outer periphery of the third backplate 743 when heat is applied to the third backplate 743, and the second backplate 742 may be contracted in the direction toward the center of the second backplate 742 when heat is applied to the second backplate 742. Therefore, as the second backplate 742 is contracted while corresponding to the expansion of the third backplate 743, it is possible to suppress creases that may occur on the corner of the display panel 110 disposed on the third backplate 743.

After the hot press process is completed, the polarizing film 120 and the cover window 130 may be disposed on the upper portion of the display panel 110.

In the display device 700 according to still another embodiment of the present disclosure, the metal plate 150 having the plurality of opening portions 153b may be disposed in the bending areas BA corresponding to the corner, thereby reducing stress caused by bending occurring on the corner. Further, it is possible to suppress a situation in which the display panel 110 is creased or the display panel 110 is damaged by compressive stress applied to the second bending areas BA2 of the corner of the display panel 110.

In addition, in the display device 700 according to still another embodiment of the present disclosure, the backplate 740 may have a thermal contraction ratio that varies depending on the bending areas BA, thereby reducing stress generated on the display panel 110. For example, the second backplate 742 may be made of a material that contracts when heat is applied, and the third backplate 743 may be made of a material that expands when heat is applied. In addition, the heat may be applied through the hot press process before the cover window 130 is attached to the display panel 110 to which the metal plate 150 and the backplate 740 are attached. Therefore, the second backplate 742 may contract in the direction toward the center of the second backplate 742, and the third backplate 743 may expand in the direction toward the second backplate 742. Therefore, the second backplate and the third backplate 743 may reduce stress generated by contraction deformation occurring on the second bending areas BA2, and suppress the occurrence of creases on the top surface of the display panel 110. In view of the above, the backplate 740 of FIG. 7 is similar to, but the inverse of, the backplate 540 of FIGS. 5 and 6, meaning for example, that the third backplate 743 expands instead of the third backplate 543 contracting as with backplate 540. Thus, the material composition and thermal expansion or contraction properties of the different sections or portions of the backplate of the display devices described herein may generally be selected to offset each other and prevent deformation and damage to the display panel 110 that result from the heat applied to the display devices during manufacturing.

Figure 8A:
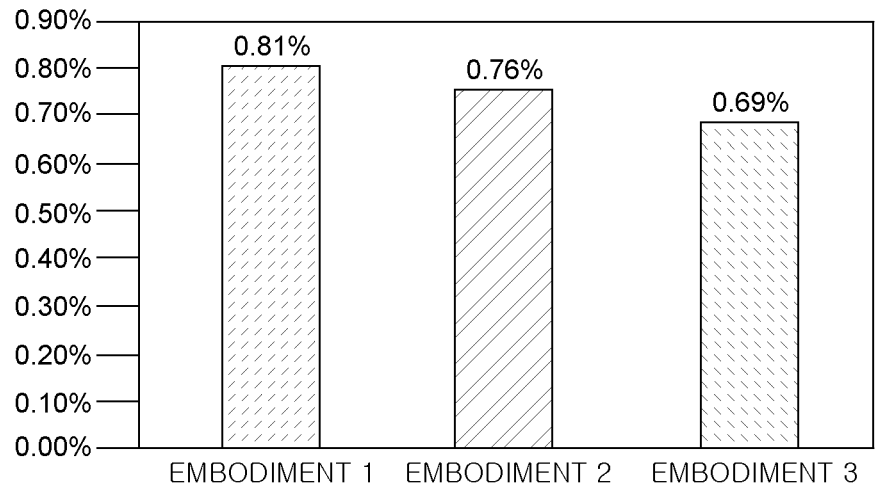
FIGS. 8A and 8B are graphs illustrating benefits and advantages of the display device according to embodiments of the present disclosure.
Figure 8B:
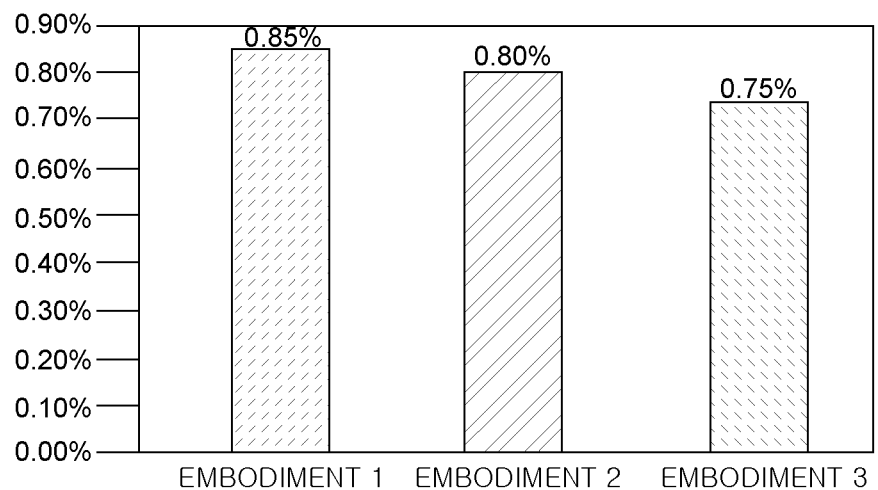

FIGS. 8A and 8B are graphs illustrating effects of the display device according to various embodiments of the present disclosure. In FIGS. 8A and 8B, Embodiment 1 corresponds to the display device 100 illustrated in FIGS. 1 to 4B, Embodiment 2 corresponds to a non-limiting example where the third backplate 743 of the display device 700 illustrated in FIG. 7 has an expansion ratio of 1%, and Embodiment 3 corresponds to a non-limiting example in which the third backplate 743 of the display device 700 illustrated in FIG. 7 has an expansion ratio of 5%. In the graph in FIG. 8A, the Y-axis indicates compressive strain of various insulation layers formed on the flexible substrate of the display panel and equivalent layers including light-emitting elements, circuit configurations, and the like. In the graph in FIG. 8B, the Y-axis indicates compressive strain of the flexible substrate of the display panel. In this case, the compressive strain indicates a minimum vertical strain rate value, i.e., a ratio of a length, which decreases in a direction in which compression is applied, to an initial length.

With reference to FIGS. 8A and 8B, in Embodiment 2, the second backplate 742 has a contraction ratio of 1%, and the third backplate 743 has an expansion ratio of 1%. Therefore, it can be seen that in Embodiment 2, the compressive strain decreases, and stress in the corner area of the display panel 110 decreases, in comparison with Embodiment 1 in which the backplate 140 has the same contraction or expansion ratio across the backplate 140, meaning the same material with the same contraction or expansion ratio at the corners and sides of the backplate 140.

In addition, with reference to FIGS. 8A and 8B, in Embodiment 3, the second backplate 742 has a contraction ratio of 1%, and the third backplate 743 has an expansion ratio of 5%. Therefore, in Embodiment 3, the third backplate 743 disposed in the second bending areas BA2 corresponding to the corner area of the display panel 110 is further expanded in comparison with Embodiment 1, in which the backplate 140 has the same contraction ratio or expansion ratio through the backplate 140, and in Embodiment 2 in which the second backplate 742 has a contraction ratio of 1%, and the third backplate 743 has a contraction ratio of 1%. Therefore, it can be seen that in Embodiment 3, the compressive strain decreases, and stress in the corner area of the display panel 110 decreases in comparison with Embodiments 1 and 2.

The embodiments of the present disclosure can also be described as follows:

According to an aspect of the present disclosure, there is provided a display device. The display device comprises a display panel including a non-bending area and bending areas, and a metal plate disposed on a lower portion of the display panel and configured to support the display panel, wherein the bending areas comprise the first bending areas corresponding to a lateral portion of the non-bending area, and second bending areas corresponding to a corner of the non-bending area, wherein the metal plate comprises a first metal plate disposed in the non-bending area, a second metal plate disposed to correspond to the first bending areas, and a third metal plate disposed to correspond to the second bending areas, wherein a groove is disposed in the second metal plate, and wherein the third metal plate comprises a plurality of opening portions.

The third metal plate may comprise a plurality of opening areas in which the plurality of opening portions is disposed, and a plurality of non-opening areas between the plurality of opening areas.

The display device may comprise a backplate disposed between the metal plate and the display panel, wherein the backplate may comprise a first backplate disposed at a position that may overlap the first metal plate, a second backplate disposed at a position that may overlap the second metal plate, and a third backplate disposed at a position that may overlap the third metal plate, and wherein the second backplate and the third backplate may have different coefficients of thermal expansion.

The second backplate may be made of a material that expands when heat is applied, and the third backplate may be made of a material that contracts when heat is applied.

The second backplate may be made of a material that contracts when heat is applied, and the third backplate may be made of a material that expands when heat is applied.

The second backplate may have a contraction ratio of 1%, and the contraction ratio may be a ratio of a length that decreases when heat is applied to the second backplate from 25 degrees to 90 degrees.

The third backplate may have an expansion ratio of 1% or 5%, and the expansion ratio may be a ratio of a length that increases when heat is applied to the third backplate from 25 degrees to 90 degrees.

The first backplate, the second backplate, and the third backplate may be each made of a polyethylene terephthalate (PET) based material.

The display device may further comprise a bonding agent configured to bond the backplate and the metal plate, wherein the bonding agent may be a thermosetting bonding agent or a thermoplastic bonding agent.

The third metal plate may comprise a first side surface, a second side surface, and a third side surface configured to connect the first side surface and the second side surface, and wherein the first side surface and the second side surface may be connected to a side surface of the second metal plate.

A distance between the first side surface and the second side surface may increase as the distance from a corner of the first metal plate increases.

An interval between a plurality of grooves of the second metal plate may decrease as the distance from the first metal plate increases.

The first metal plate, the second metal plate, and the third metal plate may be integrated.

The metal plate may be made of SUS and amorphous metal.

According to another aspect of the present disclosure, there is provided a display device. The display device comprises a display panel including a non-bending area and bending areas, and a top plate disposed on a lower portion of the display panel, wherein the bending areas comprise first bending areas corresponding to a lateral portion of the non-bending area and second bending areas corresponding to a corner of the non-bending area, wherein the top plate comprises a first top plate disposed in the non-bending area, a second top plate disposed to correspond to the first bending areas, and a third top plate disposed to correspond to the second bending areas, and wherein the third top plate is made of a material that is deformed in a direction different from a direction in which the second top plate is deformed when heat is applied.

The second top plate may be made of a material that contracts when heat is applied, and the third top plate may be made of a material that expands when heat is applied.

The third top plate may be made of a material having a deformation amount equal to a deformation amount of a material of the second top plate when heat is applied from 25 degrees to 90 degrees.

The third top plate may be made of a material having a deformation amount larger than a deformation amount of a material of the second top plate when heat is applied from 25 degrees to 90 degrees.

The display may further comprise a bottom plate disposed on a lower portion of the top plate, wherein the bottom plate may comprise a first bottom plate disposed at a position that may overlap the first top plate, a second bottom plate disposed at a position that may overlap the second top plate, and a third bottom plate disposed at a position that may overlap the third top plate.

A groove may be disposed in the second bottom plate, and the third bottom plate may include a plurality of opening portions.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The claims are not limited by the disclosure, and all the technical concepts and the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
a display panel including a non-bending area and a plurality of bending areas; and
a metal plate disposed on a lower portion of the display panel and configured to support the display panel,
wherein the plurality of bending areas include:
first bending areas corresponding to lateral portions of the non-bending area; and
second bending areas corresponding to corners of the non-bending area,
wherein the metal plate includes:
a first metal plate corresponding to the non-bending area;
a second metal plate corresponding to the first bending areas; and
a third metal plate corresponding to the second bending areas,
wherein a groove is disposed in the second metal plate, and
wherein the third metal plate includes a plurality of opening portions.

2. The display device of claim 1, wherein the third metal plate further includes:
a plurality of opening areas in which the plurality of opening portions are disposed; and
a plurality of non-opening areas between the plurality of opening areas.

3. The display device of claim 1, further comprising:
a backplate disposed between the metal plate and the display panel,
wherein the backplate includes:
a first backplate disposed at a position that overlaps the first metal plate;
a second backplate disposed at a position that overlaps the second metal plate; and
a third backplate disposed at a position that overlaps the third metal plate, and
wherein the second backplate and the third backplate have different coefficients of thermal expansion.

4. The display device of claim 3, wherein the second backplate includes a material configured to expand under application of heat, and the third backplate includes a material configured to contract under application of heat.

5. The display device of claim 3, wherein the second backplate includes a material configured to contract under application of heat, and the third backplate includes a material configured to expand under application of heat.

6. The display device of claim 5, wherein the second backplate has a contraction ratio of 1%, and the contraction ratio is a ratio of a decrease in length relative to an original length under application of heat in a range from 25 degrees to 90 degrees Celsius to the second backplate.

7. The display device of claim 5, wherein the third backplate has an expansion ratio between 1% to 5%, and the expansion ratio is a ratio of an increase in length relative to an original length under application of heat in a range from 25 degrees to 90 degrees Celsius to the second backplate.

8. The display device of claim 3, wherein the first backplate, the second backplate, and the third backplate each include a polyethylene terephthalate (PET) based material.

9. The display device of claim 3, further comprising:
a bonding agent configured to bond the backplate and the metal plate,
wherein the bonding agent is a thermosetting bonding agent or a thermoplastic bonding agent.

10. The display device of claim 1, wherein the third metal plate further includes:
a first side surface;
a second side surface; and
a third side surface configured to connect the first side surface and the second side surface, and
wherein the first side surface and the second side surface are connected to a side surface of the second metal plate.

11. The display device of claim 10, wherein a distance between the first side surface and the second side surface increases as the distance from a corner of the first metal plate increases.

12. The display device of claim 1, wherein an interval between a plurality of grooves of the second metal plate decreases as the distance from the first metal plate increases.

13. The display device of claim 1, wherein the first metal plate, the second metal plate, and the third metal plate are integral as a single, continuous, unitary body.

14. The display device of claim 1, wherein the metal plate includes stainless steel and amorphous metal.

15. A display device comprising:
a display panel including a non-bending area and a plurality of bending areas; and
a top plate disposed on a lower portion of the display panel,
wherein the plurality of bending areas include:

first bending areas corresponding to lateral portions of the non-bending area; and second bending areas corresponding to corners of the non-bending area, wherein the top plate comprises:

a first top plate corresponding to the non-bending area;

a second top plate corresponding to the first bending areas; and a third top plate corresponding to the second bending areas, and wherein the third top plate is a material configured to deform in a direction different from a direction in which the second top plate is configured to deform under application of heat to the top plate.

16. The display device of claim 15, wherein the second top plate is a material configured to contract under application of heat, and the third top plate is a material configured to expand under application of heat.

17. The display device of claim 15, wherein the third top plate is a material having a deformation amount equal to a deformation amount of a material of the second top plate under application of heat from 25 degrees to 90 degrees Celsius.

18. The display device of claim 15, wherein the third top plate is a material having a deformation amount greater than a deformation amount of a material of the second top plate under application of heat from 25 degrees to 90 degrees Celsius.

19. The display device of claim 15, further comprising:

a bottom plate disposed on a lower portion of the top plate, wherein the bottom plate includes:

a first bottom plate disposed at a position that overlaps the first top plate;

a second bottom plate disposed at a position that overlaps the second top plate; and a third bottom plate disposed at a position that overlaps the third top plate.

20. The display device of claim 19, wherein a groove is disposed in the second bottom plate, and the third bottom plate includes a plurality of opening portions.

21. A display device, comprising:

a display panel including a non-bending area with a side and a corner, a first bending area corresponding to the side of the non-bending area, and a second bending area corresponding to the corner of the non-bending area; and a metal plate disposed on the display panel, the metal plate including grooves corresponding to the first bending area and a plurality of openings corresponding to the second bending area.

22. The display device of claim 21, further comprising:

a top plate disposed on the display panel, the top plate including areas of different material.

23. The display device of claim 22, wherein the areas of different material include a first material corresponding to the first bending area and a second material corresponding to the second bending area, the first material and the second material configured to deform in different directions in response to application of heat to the top plate.

* * * * *